United States Patent [19]

Ezell, Jr.

[11] Patent Number: 5,050,438

[45] Date of Patent: Sep. 24, 1991

[54] METHOD AND APPARATUS FOR MEASURING THE FLOW OF HEAVY CRUDE

[76] Inventor: Oscar L. Ezell, Jr., 310 E. Woodrow, Taft, Calif. 93268

[21] Appl. No.: 415,727

[22] Filed: Oct. 2, 1989

[51] Int. Cl.$^5$ .............................................. G01F 1/00
[52] U.S. Cl. ........................................ 73/861; 73/196
[58] Field of Search ................ 73/195, 196, 198, 199, 73/861, 861.04, 861.07, 200

[56] References Cited

U.S. PATENT DOCUMENTS

| | | | |
|---|---|---|---|
| 3,812,714 | 5/1974 | Olofsson et al. | 73/861 |
| 4,055,083 | 10/1977 | Haas | 73/861.04 |
| 4,083,243 | 4/1978 | Cochran, Jr. | 73/196 |
| 4,141,240 | 2/1979 | Usui et al. | 73/199 |
| 4,198,860 | 4/1980 | King | 73/195 |

*Primary Examiner*—Herbert Goldstein
*Attorney, Agent, or Firm*—Dennis B. Haase

[57] ABSTRACT

A method of, and apparatus for, measuring flow rates of highly viscous source fluids, having a flow rate wherein a secondary fluid of the same viscosity is injected at a predetermined measurable rate of flow into the stream of source fluid, where the source and secondary fluids are intermixed. The flow rate of the combined fluids is then measured, and the fluid rate of flow of the injected fluid is subtracted from the total flow rate measured, to determine the rate of flow of the source fluid.

9 Claims, 2 Drawing Sheets

METHOD AND APPARATUS FOR MEASURING THE FLOW OF HEAVY CRUDE

BACKGROUND OF THE INVENTION

1. Field of the Invention

The present invention relates to a method and apparatus for measuring flow rates of viscous fluids, and has particular, although not exclusive, utility in measuring the flow of heavy crudes from oil wells.

In various oil producing fields throughout the world the crude being extracted from the earth is highly viscous. Several deposits in Kern County, California are exemplary. As a consequence, the power requirements for pumping the crude, the use of steaming techniques, and the ability to accurately measure fluid flow may make such wells marginal in value, depending upon current price levels for crude. In order to determine whether a well is productive or not, it is imperative that the operator be able to measure its output, which may be as low as one to five barrels a day, and which translates, at the lower end, into less than 0.02 of a gallon a minute.

Accordingly, it is a primary objective of the present invention to provide apparatus for measuring, accurately, the flow from heavy crude wells.

It is yet another objective of the present invention to be able to use such apparatus for measurement of several wells, selectively, sequentially, and to take several timed measurements on each well.

2. Overview of the Prior Art

Flow measuring devices currently in use have the capability of accurately measuring fluid flows as low as nine gallons a minute. Below that flow rate, however, accurate measurement of viscous fluids such as heavy crude is virtually nonexistent, at least insofar as field applications are concerned.

Flow measuring devices are, of course, not unheard of, Flint U.S. Pat. No. 672,935, having disclosed such a device as early as 1901. The essence of that patent, however, was an apparatus for protecting gas meters against inordinately high flow, as distinguished from low flow, as is the present case. Other measuring and pressure control devices are disclosed in Goldkamp U.S. Pat. No. 2,115,259 and Thieme U.S. Pat. No. 3,593,575. Finally, Holzum U.S. Pat. No. 4,193,299 suggests a device for controlling fuel flow for an internal combustion engine, but does not deal with viscous fluids such as heavy crude.

In point of fact, there simply is not a device, currently in use, which will accurately measure the flow of viscous fluids at flow rates in the range of 0.1 gallons per minute and above until the advent of the present invention.

SUMMARY OF THE INVENTION

The present invention accomplishes the objectives for which it was devised, by creating known, measurable flow rate which precisely parallels the actual flow rate of crude being delivered from a particular selected well. This is accomplished by the construction of a manifold assembly, into which the output of a well to be tested, is injected. As will be more particularly described hereinafter, a fluid accumulator, in this instance a plenum chamber, is provided for the receipt of crude flowing in the manifold, and upon the pressure in the plenum reaching a predetermined level, the fluid is forced, under pressure, back into the manifold at a rate which can be measured on existing commercial flow meters. Since the flow from the plenum is a known controlled rate, when it combines with the flow in the manifold, the flow rate of the well is readily calculated, thereby giving the operator invaluable data from which he can evaluate the well's production and, not insignificantly, be paid for its production.

DESCRIPTION OF THE DRAWING

A detailed description is provided hereinafter, and should be viewed in conjunction with the drawing, wherein.

DETAILED DESCRIPTION OF THE PREFERRED EMBODIMENT

Figure 1:
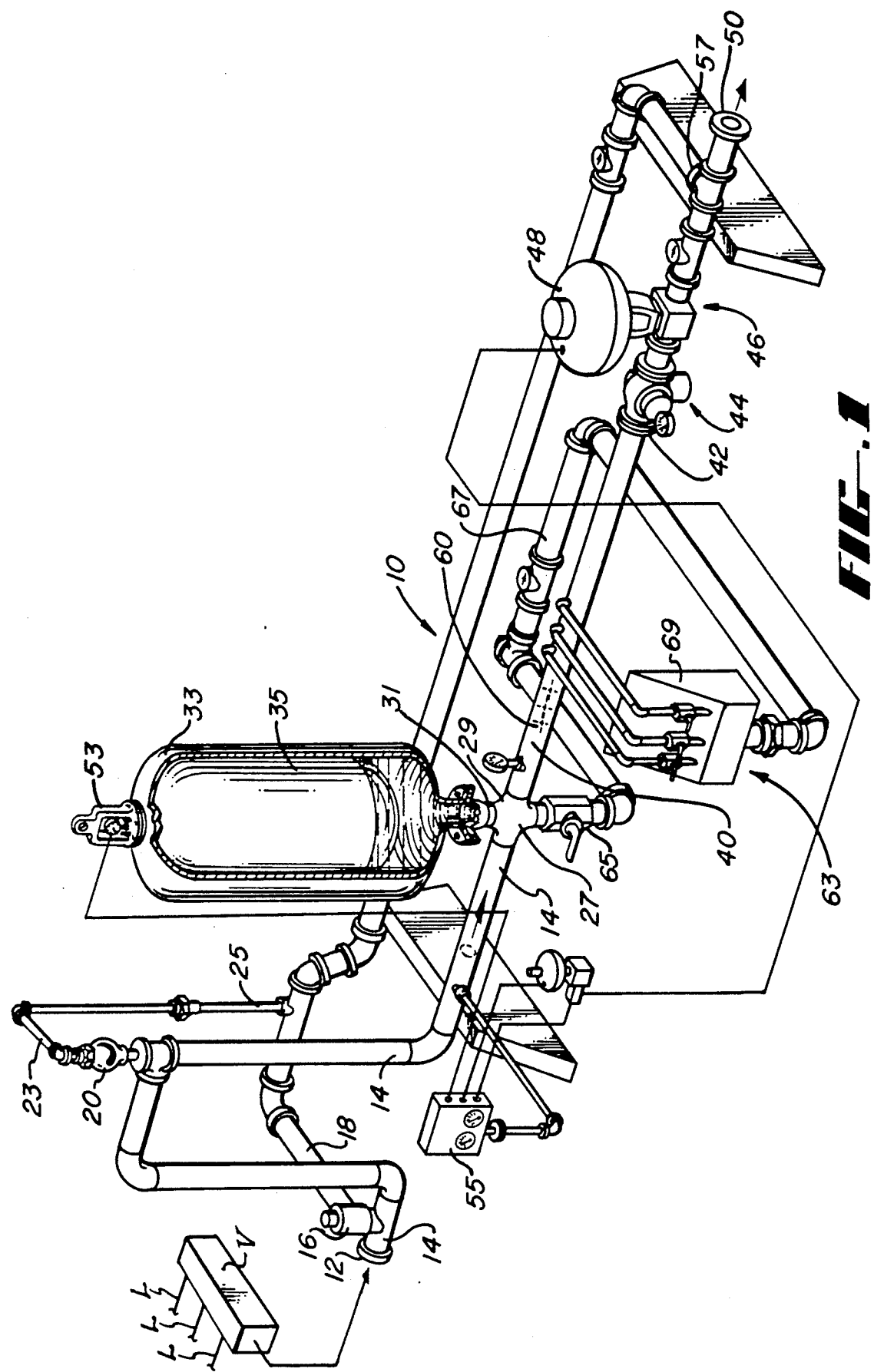
FIG. 1 is a perspective of the apparatus of the present invention, partially cut away to illustrate certain details thereof.
Figure 2:
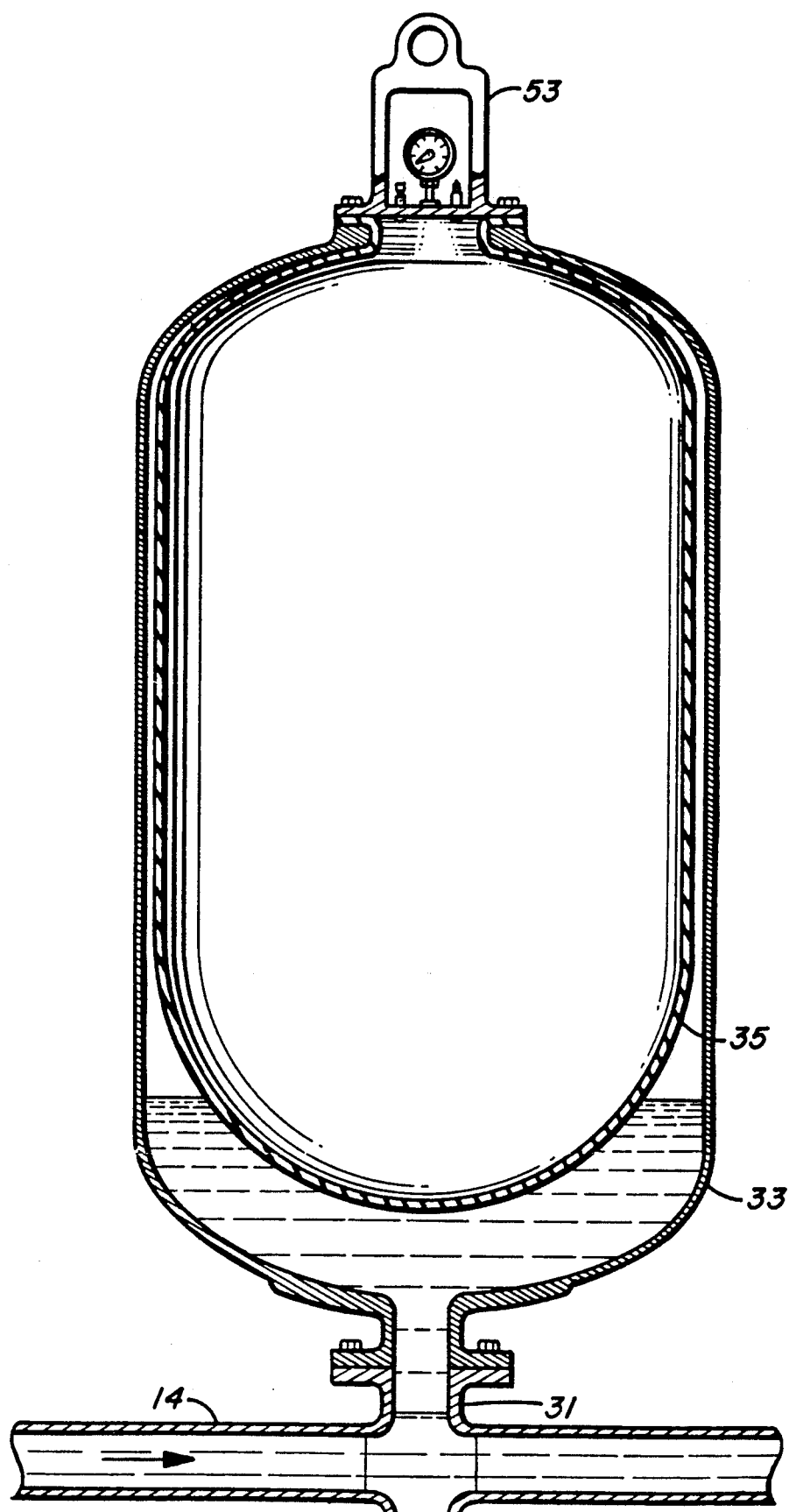
FIG. 2 is a partially sectional view of the plenum of FIG. 1, showing further detail of the invention.

The problem for which the present invention provides a unique solution is to provide a method of measuring the flow of highly viscous fluid streams moving at a rate less than can be commercially measured. The method of the present invention contemplates the measurement of the flowing of a viscous fluid in a manifold by injecting fluid of an equal viscosity into the manifold upstream of a measuring device at a predetermined measurable rate of flow. Thereafter, a measuring device reads the combined flow of the source fluid and the injected fluid. By subtracting the known flow rate of the injected fluid, the flow rate of the source fluid can be found.

With reference now to the drawing, a preferred embodiment of the present invention is illustrated in detail. There is shown a manifold assembly 10 having an inlet 12 which connects to one or more wells (not shown). It is contemplated that by use of a switching device, several wells can be attached to the manifold, and each well can be flow tested in accordance with the present invention. Indeed, the use of automatic switching apparatus, well known in the industry, would permit several wells to be tested in a predetermined sequence, automatically.

The manifold 10 comprises an upstream pipe assembly 14, into which is inserted a pressure relief valve 16. The pressure relief valve is of conventional construction, and may be preset to a desired relief pressure. When such pressure is experienced, at the valve, the valve opens to discharge excess oil into the discharge line 18.

The inlet pipe, downstream of the pressure relief valve 16, is formed into a U-shape, and at the top of the "U" is a gas purging device 20 which permits the removal of air and gas entrapped in the crude. Gases thus purged are ejected through gas line 23 and into the discharge line 18, to which the gas line is connected at 25.

A model, or controlled fluid flow system is provided, in accordance with the invention, having as its primary purpose, assurance that a measurable flow rate will be available for measurement no matter how little flow is available from the well. To this end, the upstream pipe assembly 14, in accordance with the present invention, terminates at a junction 27. A multi-port cross connector 29 from the junction 27 provides an opening, through port 31, to a fluid accumulator device, in this instance, a plenum chamber 33. The plenum chamber, as illustrated, opens transversely to the direction of oil flow in the manifold represented by arrow 0, and oil flowing in the manifold will, during a cycle of operation of the device, fill the plenum, as will be more particularly described hereinafter.

In order to effect controlled filling and discharge of the plenum, a flexible bladder 35 is disposed within the plenum, and is of a lesser size and shape than the inner walls of the plenum. The bladder is constructed of any suitable material which will provide the required flexibility and wearability, and is charged with an inert gas such as nitrogen, to an initial pressure approximating line pressure.

Axially aligned with the upstream pipe assembly at the point where it connects to the multi-port connector, is a downstream pipe assembly 40, which engages the multi-port connector 29 at the junction 27 such as to provide free passage of crude from the upstream pipe assembly to the downstream pipe assembly under certain conditions.

The downstream pipe assembly connects at 42 to a flow meter, or measuring device 44, of known construction, the FLOWCO positive displacement meter being typical of such devices. A control valve 46 is provided in the downstream pipe assembly, downstream of the flow measuring device, and in the case illustrated, is in a "normally closed" configuration, such that the fluid flow in the downstream pipe assembly is cut off under normal conditions. The valve 46, in its illustrated form, employs a diaphragm assembly 48 to open and close a gate-type valve. It will be appreciated that any one of several valve configurations may be used without departure from the invention.

In operation, it will be appreciated that when the valve 48 is in its open position, crude will flow from the inlet 12 through the upstream and downstream pipe assemblies, and exit the manifold at 50. Conversely, when the valve assembly 46 is in its closed position, fluid will accumulate in the upstream and downstream pipe assemblies and flow into the plenum 33, filling the same. It has been found that a plenum of 40 gallon capacity works particularly well.

As previously described, the essence of the invention is to provide a known controlled fluid flow which will achieve a measurable rate of flow, when added to the flow from the well being tested. This is accomplished in accordance with the invention, by providing a pressure measuring device 53 in contact with the bladder 35. By means of a pressure transducer, or some other known measuring device, pressure within the bladder 35, is measured as the plenum fills. As that pressure reaches a predetermined value, which would be a value above the pressure at the inlet 12, the pressure measuring device, which is connected to a control system 55 by signal transmitting means 56 signals the control system 55 which, in turn, actuates the diaphragm assembly 48 to open the valve 46. An opening pressure is selected to be compatible with the capacity of the plenum, such that, upon reaching the predetermined trigger pressure to open the valve, the known quantity of fluid, under pressure, in the plenum 33 will be discharged or dumped into the downstream pipe assembly at a measurable rate such as 42 gallons per minute, where it combines with the flow from the well being tested and the two flow components, the one from the plenum being known, will be measured and quantified by the flow measuring device 44, thereby giving the operator an accurate determination of the actual flow from the well being tested. By using a 40 gallon plenum and an appropriate dump pressure, a flow rate of 42 gallons per minute can be created. That rate, subtracted from the measured rate, gives the test well rate.

It will be appreciated that the control may take any one of several known "state of the art" forms. Indeed, the system is susceptible to being computerized and totally automated to cycle between any number of wells, performing any specified number of tests per well, on a timed basis.

It will be seen that the discharge line reconnects to the downstream pipe assembly at 57 such that fluid in the discharge line is thus returned to the main stream at the manifold exit 50.

In order to ensure a homogeneous mixture in the downstream pipe assembly, the invention contemplates the use of several baffles, 60, which are disposed in the downstream pipe assembly and which results in an emulsification of the fluid, thereby enhancing homogeneity.

There is also provided, in accordance with the invention, a sampler system indicated generally at 63. The sampler system is accessed at the junction 27 by means of a valve 65 which permits fluid access to the downstream pipe assembly 40 to the sampler line 67, which feeds fluid to the collector box 69.

Having thus described a preferred embodiment of the present invention, what is claimed is:

1. Test apparatus for measuring the flow of viscous source fluids being pumped from one of a selected number of sources at a low flow rate, comprising in combination a manifold through which the source fluid flow flows;

a fluid accumulator means, said fluid accumulator means being mounted to said manifold;

means defining a fluid passage between said manifold and said fluid accumulator means; a valve in said manifold downstream of said fluid accumulator means operable between an open and closed position such that when said valve is closed, fluid in said manifold flows into, and is accumulated under pressure in said fluid accumulator means;

means for sensing fluid pressure in said fluid accumulator means, control means connected with said pressure sensing means and said valve for opening said valve upon pressure in said fluid accumulator means reaching a predetermined level, so that accumulated fluid in said accumulator is injected into said manifold, and flow meter means disposed in said manifold between said fluid accumulator means and said valve for measuring the combined fluid flow.

2. The apparatus as described in claim 1 wherein said fluid accumulator comprises a plenum chamber, said plenum having a collapsible bladder therein, said bladder being charged with an inert gas of predetermined volume at a predetermined pressure; said bladder being squeezed as said plenum chamber fills with fluid, and said bladder being in contact with said pressure sensing means.

3. The apparatus as described in claim 2 wherein the volume of fluid in said plenum, when the predetermined pressure in said bladder is achieved is uniform, and the rate of flow of said fluid injected into said manifold is uniform, and at a rate greater than the minimum rate readable by said meter.

4. The apparatus as described in claim 2 wherein the fluid from said plenum injected into said manifold is commingled with flow in said manifold directly from a source, such that said flow meter means measures the combined flow of commingled fluids.

5. The apparatus described in claim 2 wherein said predetermined pressure is such that the volume of fluid in said plenum when said pressure is reached results in a flow in said manifold at said flow meter means, in a measurable flow of 42 gallons per minute.

6. The apparatus described in claim 2 wherein means is provided for switching between one of several fluid sources, and automatically cycling the test apparatus to provide measurements for each source; and means for recording the results of each test.

7. The apparatus as described in claim 1 wherein mixing means is disposed in said manifold between said accumulator means and said flow meter means for intermixing the source fluid and the injected fluid into a resultant measurable homogeneous fluid.

8. A method of measuring the flow of a viscous fluid passing through a manifold from a fluid source, comprising:
   accumulating a portion of said viscous fluid in a vessel under pressure;
   injecting said accumulated fluid into said manifold at a measurable rate of flow;
   commingling said injected fluid with said fluid from the fluid source;
   measuring the flow rate of the combined fluids;
   subtracting from the combined flow rate, the flow rate of the injected fluid to arrive at the flow rate of fluid from the fluid source.

9. The method of claim 8 wherein the fluid injected is flowing at a rate of 42 gallons per minute.

* * * * *